Oct. 30, 1951 W. M. BACON 2,572,831

COMMUNICATION SYSTEM

Filed Nov. 24, 1947 11 Sheets-Sheet 1

INVENTOR
W. M. BACON
BY J. W. Schmied
ATTORNEY

Oct. 30, 1951 W. M. BACON 2,572,831

COMMUNICATION SYSTEM

Filed Nov. 24, 1947 11 Sheets-Sheet 2

INVENTOR
W. M. BACON
BY J. W. Schmied
ATTORNEY

Oct. 30, 1951 W. M. BACON 2,572,831

COMMUNICATION SYSTEM

Filed Nov. 24, 1947 11 Sheets-Sheet 3

INVENTOR
W. M. BACON
BY
J W Schmied
ATTORNEY

INVENTOR
W. M. BACON
BY J. W. Schmied
ATTORNEY

INVENTOR
W. M. BACON
BY [signature]
ATTORNEY

Oct. 30, 1951 W. M. BACON 2,572,831

COMMUNICATION SYSTEM

Filed Nov. 24, 1947 11 Sheets-Sheet 6

INVENTOR
W. M. BACON
BY J W Schmied
ATTORNEY

INVENTOR
W. M. BACON
BY
J W Schmied
ATTORNEY

INVENTOR
W. M. BACON
BY
J W Schmied
ATTORNEY

Oct. 30, 1951 W. M. BACON 2,572,831
COMMUNICATION SYSTEM
Filed Nov. 24, 1947 11 Sheets-Sheet 9

INVENTOR
W. M. BACON
BY
J W Schmied
ATTORNEY

INVENTOR
W. M. BACON
BY J W Schmied
ATTORNEY

INVENTOR
W. M. BACON
BY J. W. Schmied
ATTORNEY

Patented Oct. 30, 1951 2,572,831

UNITED STATES PATENT OFFICE 2,572,831

COMMUNICATION SYSTEM

Walter M. Bacon, New York, N. Y., assignor to Bell Telephone Laboratories, Incorporated, New York, N. Y., a corporation of New York Application November 24, 1947, Serial No. 787,631

7 Claims. (Cl. 178—2)

Figures 1, 12:
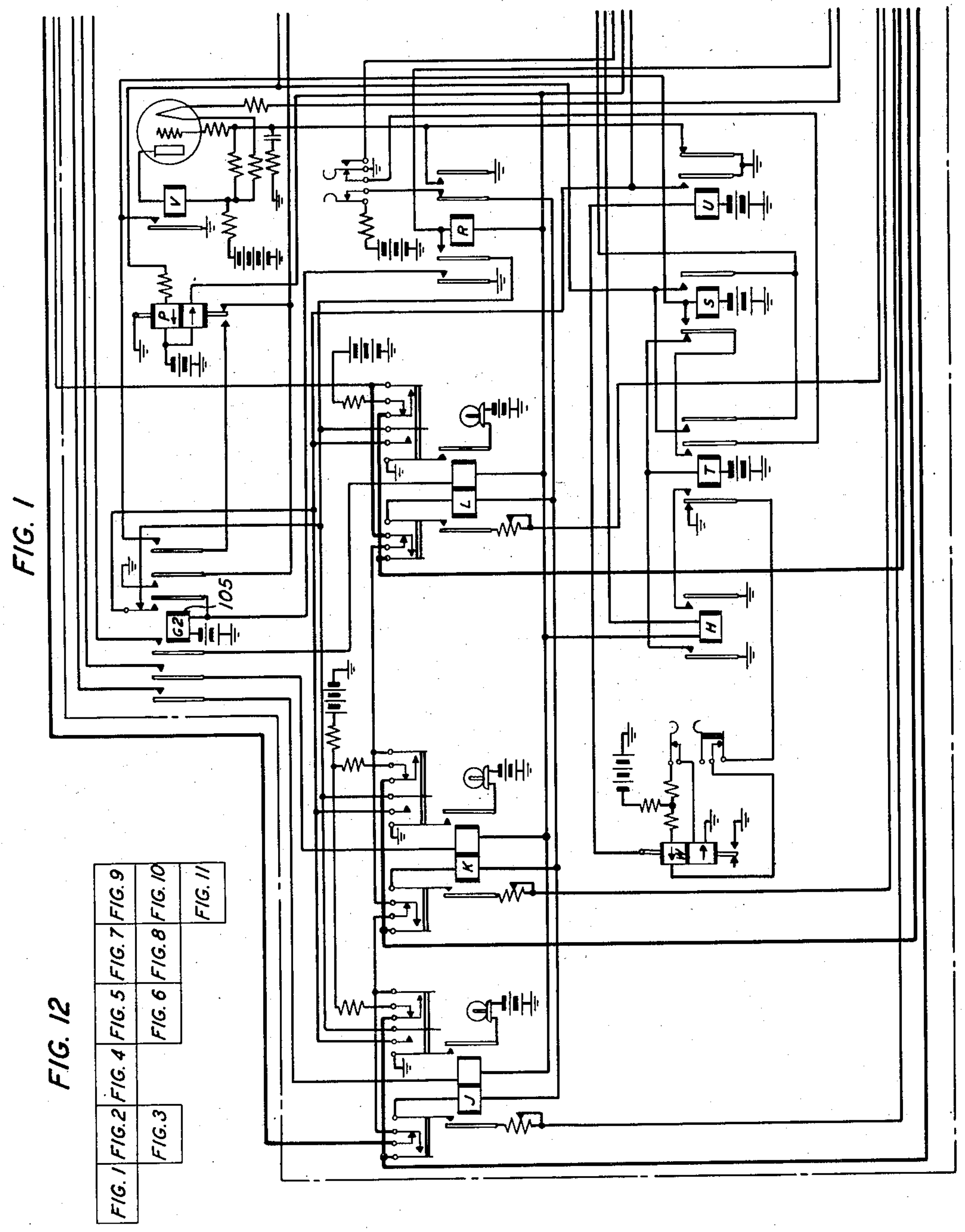

This invention relates to communication systems and more particularly to telegraph switching systems of the storage type in which the messages are first stored at the switching point and then their transmission toward their station of destination controlled in accordance with the stored signals.

This invention is directed more particularly to improvements in the types of telegraph systems disclosed in patent applications of Bacon-Kinkead-Krecek Serial No. 383,490, filed March 15, 1941, which issued as United States Patent 2,381,871 on August 14, 1945 and Branson-Kinkead-Krecek-Locke Serial No. 448,878, filed June 27, 1942 which issued as United States Patent 2,430,447 on November 11, 1947.

An object of the present invention is to expedite the transmission of messages through the switching systems and at the same time reduce the labor on the part of the subscribers or attendants at the outlying stations when it is desired to transmit messages of certain types.

Another object of the present invention is to provide and improve the switching arrangement capable of receiving a message addressed to or intended for a plurality of stations located on different party lines and providing means for transmitting said message simultaneously through the switching equipment toward all the stations on all the party lines selectively in accordance with the address or addresses preceding the message.

A feature of the invention relates to switching circuits and apparatus for seizing a local transmission path within the switching office when it becomes idle and holding it busy until all other similar paths to which it is desired to transmit the message are likewise seized, and then transmitting the message over the seized paths simultaneously to other storage equipment for later transmission towards the stations of the destination of the messages either simultaneously, concurrently or sequentially in turn with other messages directed to the respective lines.

Another feature of the invention relates to circuits and apparatus for separating multiply addressed messages from regular messages and removing them from the storage devices employed for the normal transmission of ordinary messages through the system, and thus expediting or preventing the delay of ordinary messages during the time required for the seizure of the necessary paths and transmission of the multiply addressed message.

Still another feature of the invention relates to switching circuits responsive to either the first or to a combination of two permutation codes representing two symbols or characters preceding each message for directing the message to a multiply addressed message circuit, and further equipment responsive to one or the other of said two code combinations or to other codes for selecting the desired stations on the respective party lines to which the message is to be transmitted.

Further features of the invention relate to indicating devices and manually controlled switches for permitting an operator or attendant at a central point to supervise, interrupt, and control the transmission and direction of the message to the proper party lines.

Briefly, in accordance with the present invention a multiple address circuit is provided at one or more central switching centers of the type disclosed in either of the above-identified patent applications. Switching equipment at these switching centers is then conditioned to respond to the multiple address codes preceding each message to direct the multiple address messages to this circuit and thus remove them from the storage devices employed to direct ordinary messages to the stations of their destination. The multiple address message is again stored in the special multiple address circuit where an operator will observe the tape or other medium or mechanism storing the message and will thus determine the lines to which the message is to be directed. The operator will then operate appropriate keys or switches associated with the lines to which the message is to be transmitted. Thereafter, the circuit equipment will seize a transmission path which is one of the multiple transmission paths extending to the selected lines and hold it busy until a path to each one of the desired lines is seized whereupon the operator will receive an indication so that if she has not previously done so she may then operate an additional switch and cause the transmission of the message to the outgoing line circuit associated with the respective line. Thereafter, the message is transmitted over each of the outgoing lines in a normal course. When the multiply addressed message is transmitted over the lines, one or the other of the multiply addressed code combinations, if there are more than one, will be employed to direct the message to the desired one or ones of the stations connected to the respective party lines.

It is thus possible for a subscriber to properly address a message to a plurality of stations and transmit the message preceded by the proper address or addresses to the central switching station. The message will then be transmitted automatically to each of the stations to which it is directed. Such an arrangement expedites the transmission over the entire system by reducing the number of messages necessary to be transmitted over the lines from the outlying subscriber station to the central switching station, and likewise reduces the time and effort required of the attendant or subscriber originating the message because heretofore the subscriber has had to prepare the message for each of the party lines or each of the stations thereon and precede the various messages with the proper address code or codes. In accordance with the present invention, however, it is only necessary for the subscriber to prepare the message once and precede it by the proper multiple address code or codes and transmit it once over the line to the central switching station where the message will be thereafter transmitted to each of the stations desired without any further work on the part of the subscriber or attendant.

The foregoing and other objects and features of the invention may be more readily understood from the following description when read with reference to the attached drawing which shows an exemplary embodiment of the invention arranged to cooperate with the system disclosed in the above-identified patent application of Branson et al. 448,878, filed June 27, 1942.

It will be readily apparent to persons skilled in the art that the arrangement may be incoporated in the above-identified application of Bacon et al. with only minor modifications necessitated by the specific circuits employed in said Bacon et al. application.

The following description and drawing are not intended to in any way limit or increase the scope of the claims appended hereto which point out with particularity the novelty of the present invention.

Figs 1 through 11 inclusive show circuit details of the exemplary party line in the switching center incorporating the present invention;

Fig. 12 shows the manner in which Figs. 1 through 11 are positioned adjacent one another in order to show details of an exemplary system embodying the present invention.

Figure 2:
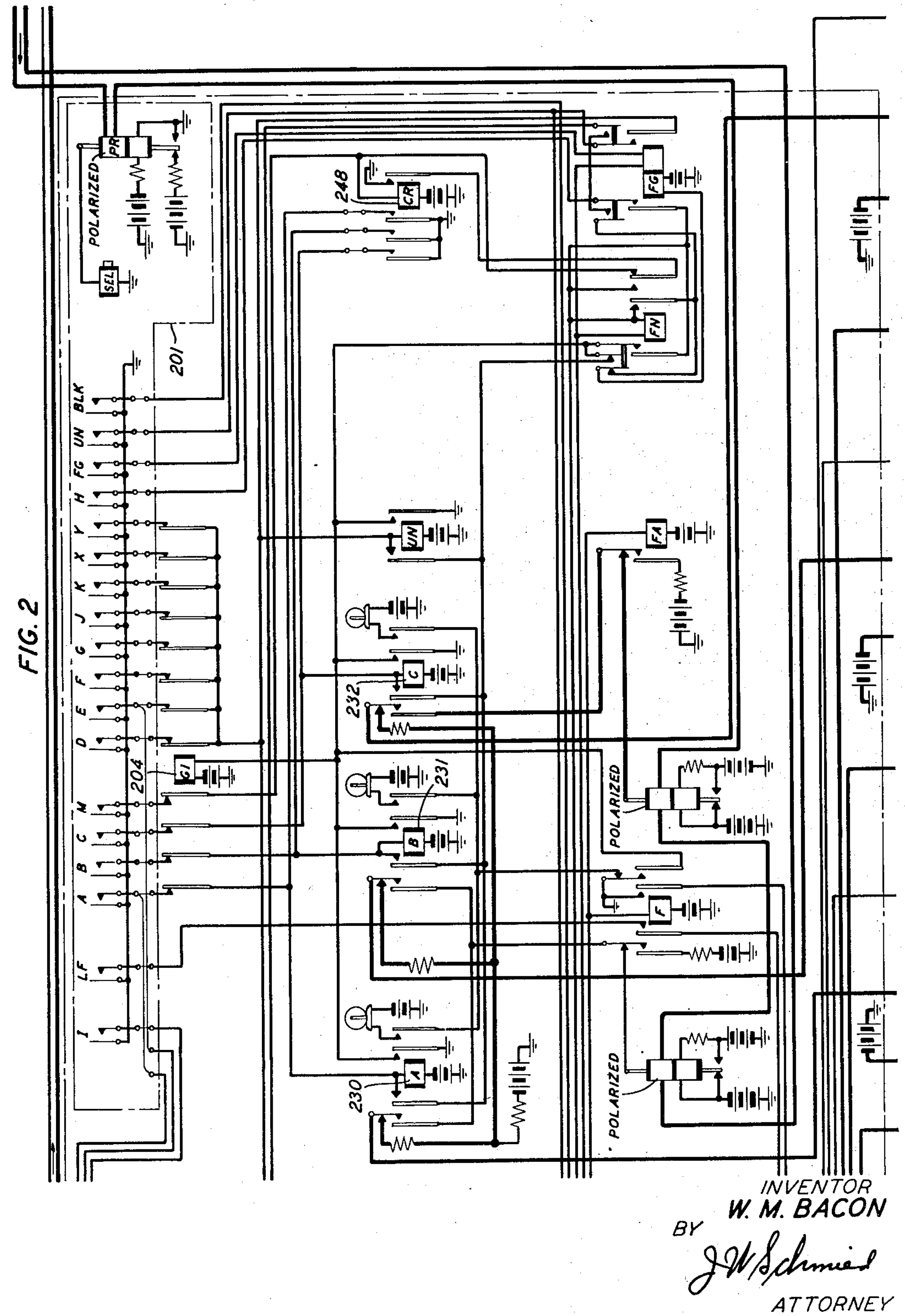

Figs. 1, 2, 3 and 4 show in outline form two multiparty subscribers' lines of the type disclosed in the above-identfied application of Branson et al. Figs. 1 and 2 show in detail circuits and equipment of one of the control stations or secondary switching centers. As shown in these figures, the equipment is arranged to control the transmission and receiving equipment at three stations 316, 317 and 318 shown in Fig. 3.

Figure 3:
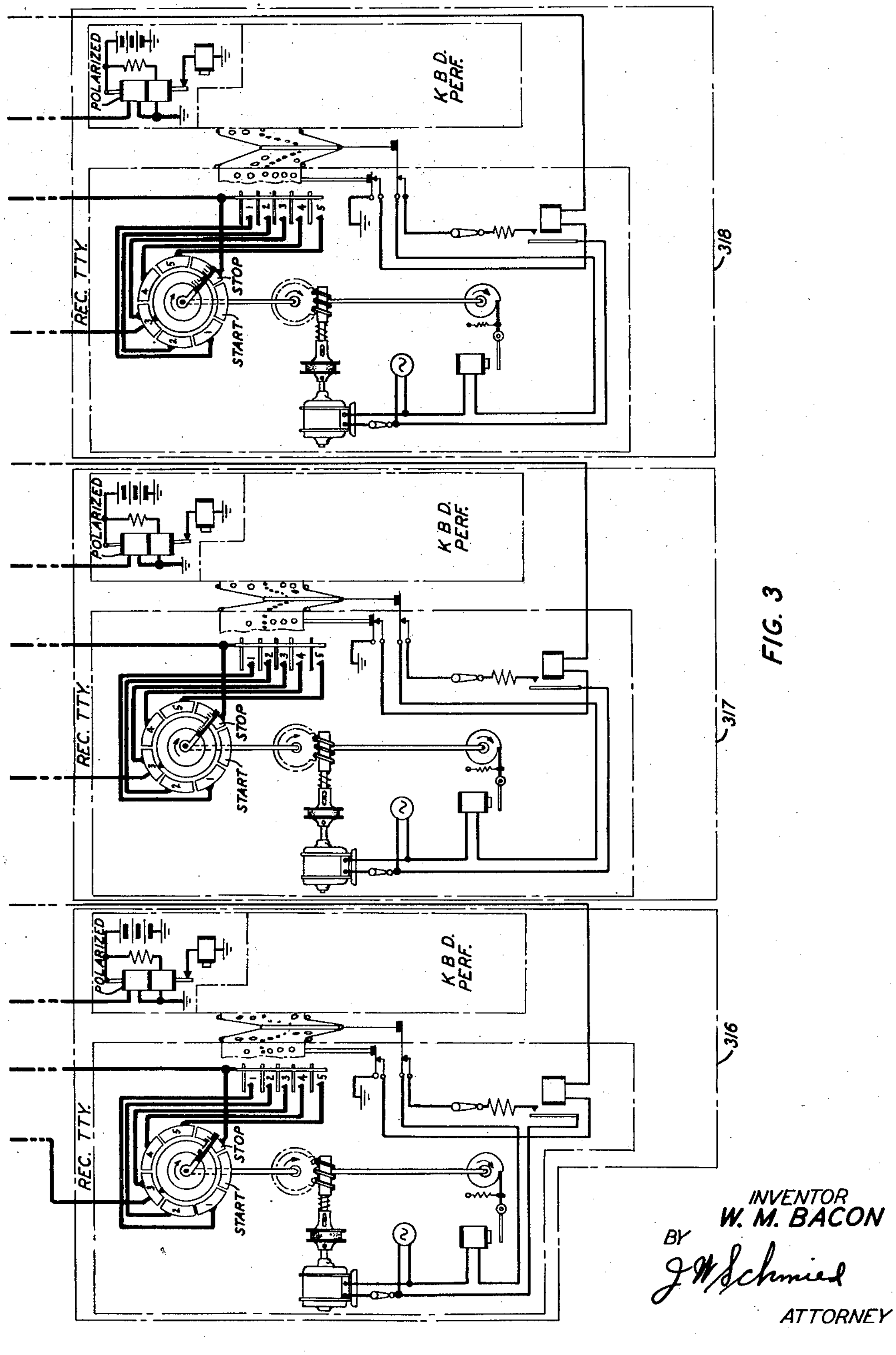
Figure 4:
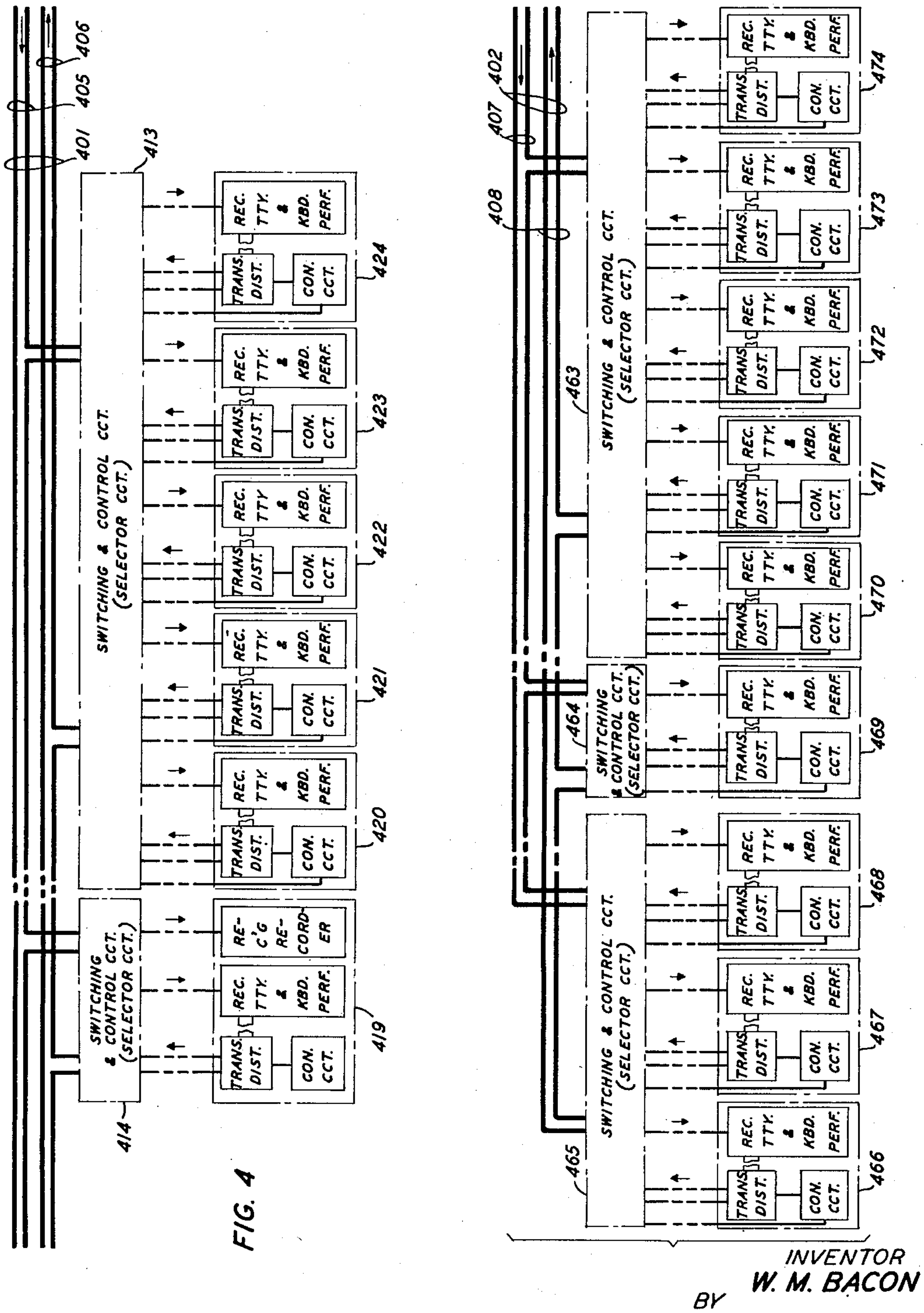
Figure 5:
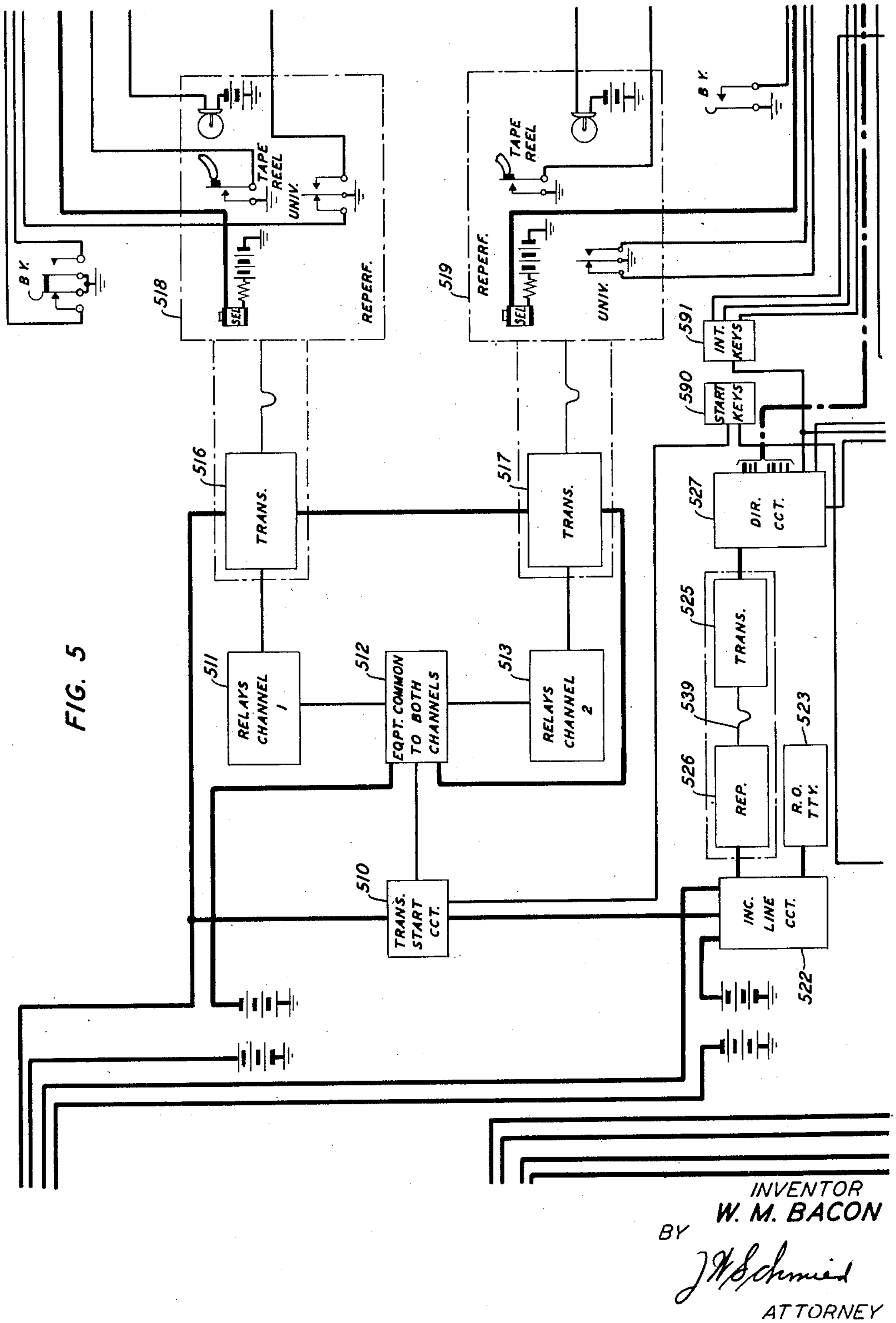
Figure 6:
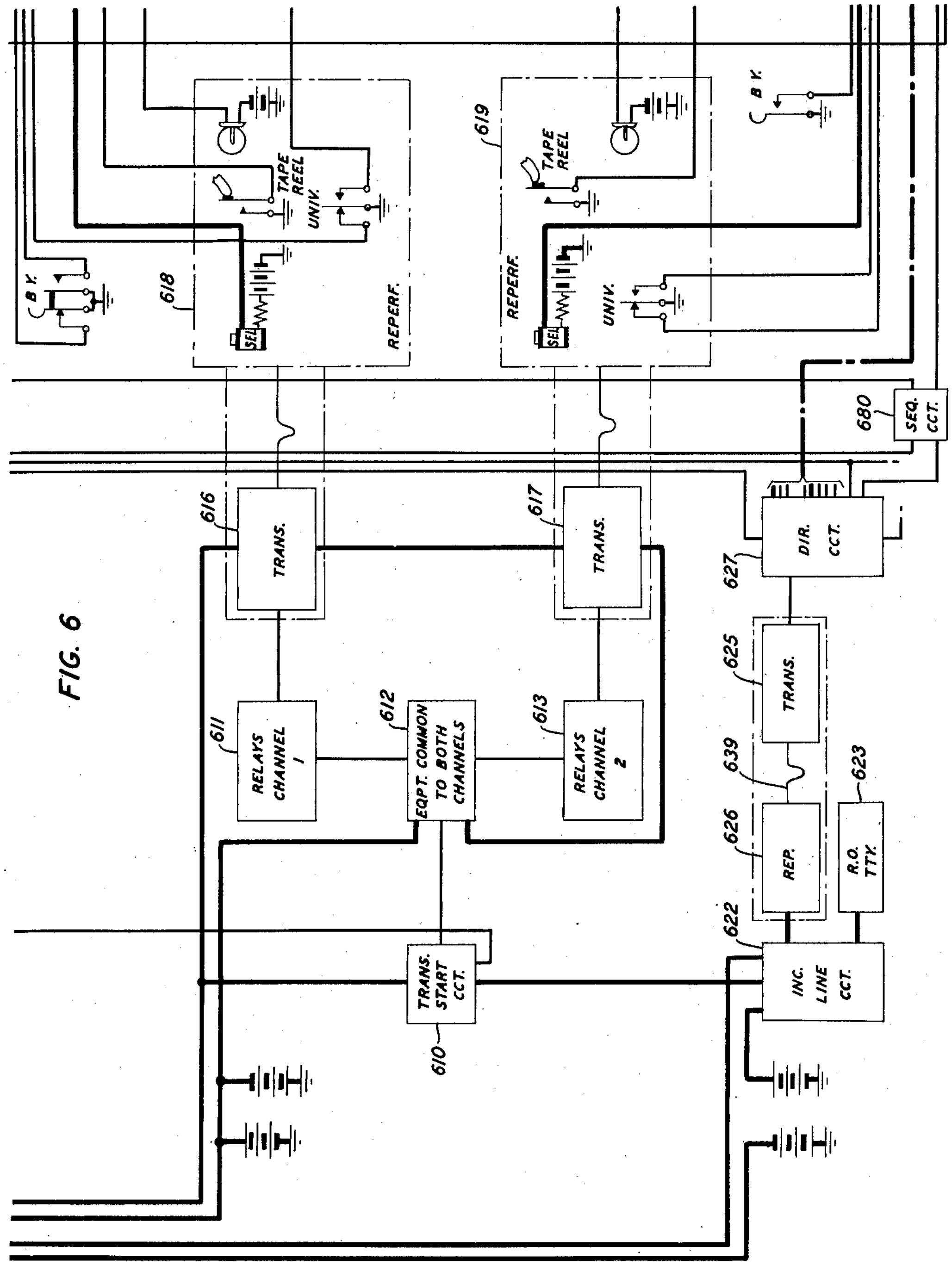

Fig. 4 shows in outline form similar control equipment 414 for controlling the equipment at station 419. The control equipment 413 is provided for controlling the transmitting and receiving equipment at stations 420, 421, 422, 423 and 424. As shown in Figs. 1, 2, 3 and 4 the above enumerated stations are all connected to party line 401 extending to the central switching station shown in Figs. 5, 6, 7, 8, 9, 10 and 11.

The lower half of Fig. 4 shows control stations 465, 464 and 463 controlling stations 466, 467, 468, 469, 470, 471, 472, 473 and 474. All of these stations are connected to a party line extending to the central switching station.

The control stations may be located at considerable distance one from the other while the local stations will usually be located relatively near their control stations. Thus the location and number of the control stations will be controlled by the location and number of the local or subscribers' stations.

Each of the subscribers' stations is provided with a receiving device for receiving the teletypewriter signals; a keyboard perforator for punching or perforating tape under control of manually operated keys in accordance with the signals to be transmitted; an automatic tape transmitter for transmitting the signals recorded in the tape; and certain control relays and circuits for controlling transmission and reception at the subscribers' stations. As shown in Fig. 4 station 419 is provided with an additional receiving device which in an exemplary embodiment comprises an automatic recorder for punching or perforating tape in accordance with received signals. This tape is available to control the automatic transmission over other lines not connected to the exemplary switching system disclosed in this application.

Except for the minor changes as will be described hereinafter the equipment at the control stations or secondary switching centers as well as circuits and apparatus at the subscribers' stations all operates in substantialy the same manner as set forth in detail in the above-identified patent application of Branson et al. to which reference is made for a detailed description of the operation of this equipment. The disclosure of the above-identified Branson et al. application is accordingly hereby made a part of the present application to the same extent as though both the description and drawing thereof were fully included in the present specification and drawing.

Briefly the subscriber will perforate the tape in accordance with the mesages to be transmitted to other stations. Prior to the perforation of each message the subscriber will perforate two address code combinations, in the exemplary system set forth herein. Persons skilled in the art, however, will readily understand that any suitable number of address or station identifying codes or symbols may be perforated in the tape preceding each message. Other information, when desired, such as date, time of day, message number, station of origin, etc. may be transmitted prior to or during the message when it is so desired. Following each message the subscriber perforates the end of message signal which in the exemplary system comprises a figure signal followed by an H signal and then a letter signal. Following the message or a group of messages the subscriber will normally perforate the end of transmission signal in the tape. Upon preparing a tape of one or more messages in the manner described above the subscriber will then insert the tape in the automatic tape controlled transmitter at the subscriber's station.

The system is arranged to, either periodically or under the control of an operator, test the transmitters at the various subscribers' stations of each of the party lines to determine whether or not any message material is ready for transmission. When found available this material is transmitted to the central switching station. At the central switching station the messages are first stored and then transmitted to the line extending to the desired station. The message is transmitted over the line and then transmitted to the proper station under control of the secondary switching centers associated with the various stations on the party line.

As shown in the drawing the party lines comprise a transmission path operative to transmit signals in both directions, one for receiving at the subscribers' stations and the other transmitting from the subscribers' stations to central switching stations. As shown in the drawings these transmission paths are represented by two lines representing a metallic line. It is to be understood, however, that these transmission paths may include any suitable type of transmission systems or means including grounded telegraph lines equipped to operate in one direction or both directions on the full duplex basis. These transmission paths may also include cable circuits and conductors including submarine cable circuits, transmission paths of voice frequency and high frequency carrier currents, radio transmission links of any suitable wavelength including the ultra-short or microwave region wherein the waves transmitted are characterized by semi-optical properties or the paths may include any other suitable transmission means. These paths will also include suitable repeaters for terminating and interconnecting the various types of transmission paths which may be incorporated in them including the vacuum tube amplifiers, carrier current radio amplifiers and repeaters, low frequency telegraph relay repeaters as well as the generative repeaters of any suitable type capable of transmitting the frequency range required.

As shown in the drawings both party lines 401 and 402 extend to the same number of stations controlled by the same number of secondary switching control centers. Persons skilled in the art will at once understand that the arrangements shown in the drawings are exemplary only and in practice each of the lines will extend to a different number of subscribers' stations controlled by the desired number of secondary switching centers. It is, of course, possible that in some cases two similar lines may extend to a similar number of stations as shown in the drawing.

The equipment at the central office operates in substantially the same manner as described in the above-identified application of Branson et al. The incoming channel 406 of party line 401 terminates in the incoming line circuit 522. The incoming line circuit 522 is connected to a recording instrument 526 for perforating or punching tape 539 in accordance with the received signals. The receiving-only printer 523 is also associated with the incoming line circuit 522. This equipment is arranged so that messages preceded by address codes identifying the central switching station are directed to receiving-only teletypewriter 523. Messages preceded by all other address codes are directed to the printing reperforator 526. Some messages may be directed to both of the devices 523 and 526.

Messages directed to receiving-only printer 523 may be removed from the machine and given to the person for whom they are intended.

The messages recorded by the reperforator 526 are stored in the tape 539 which tape is then employed to control the automatic transmitter 525 and the director circuit 527. The transmitter 525 and director circuit 527 operate to control the cross-bar switch magnets shown in Figs. 9 and 11 to connect the transmitter 525 to another storage device such as reperforator associated with the outgoing line.

Reperforators 518 and 519 are such reperforators associated with the outgoing channel 405 party line 401. Similar reperforators 618 and 619 are individual to the outgoing channel 407 of party line 402. Each one of these reperforators is individual to a vertical column of contacts in the cross-bar switch and record messages transmitted to it from the automatic transmitter 525 in a second perforated tape.

As many of these outgoing channel storage devices may be associated with or individual to each of the outgoing channels as may be desired. The above-identified Branson et al. application shows two of such reperforators associated with one outgoing line and one associated with another line. In the present application two reperforators 518 and 519 are associated with the party line 401 and two other reperforators 618 and 619 are associated with the party line 402. When desired three or more may also be associated with other outgoing lines depending upon traffic conditions both on the outgoing lines and through the switching equipment.

An automatic tape controlled transmitter 516 is associated with the reperforator 518 and an automatic tape transmitter 517 is associated with the reperforator 519. A plurality of relay control circuits 511, 512, 513 are provided to control the transmission from the transmitters 516 and 517 so that when they both have message material to transmit they will transmit alternately one message at a time. If only one of them has one or more messages to transmit it will transmit all of this material.

In addition a transmitter start circuit 510 is provided for transmitting over the outgoing channel 405 of party line 401. This transmitter start circuit may be controlled automatically from the incoming line circuit 522 or it may be controlled manually as described in the above-identified application of Branson et al.

Thus, when a message intended for a station connected to line 401 is received by one or the other reperforators 518 or 519 this message is stored in the tape associated therewith and in turn causes the transmitter individual thereto to transmit the message over the line to the station of address.

The second party line 402 shown in the drawing is provided with a similar circuit equipment in the switching station comprising incoming line circuit 622 and receiving printer 623, recording or reperforator 626, tape transmitter 625 and director circuit 627 which control the cross-bar switch as described in the above-identified application of Branson et al. The outgoing channel 407 of party line 402 is provided with two reperforators 618 and 619 each of which has associated with it the tape controlled transmitters 616 and 617, respectively. These transmitters are controlled by the relay circuits and equipment 611, 612 and 613 so that they transmit messages stored in their tapes alternately one after another until all the messages stored in both of their tapes have been transmitted. In addition the transmitter start circuit 610 is provided for controlling the transmission from the subscribers' stations to the central switching station.

In accordance with the present invention multiple address equipment is provided. This equipment and apparatus is arranged at the central switching station so that multiple address messages are directed to a special storage and printing reperforator machine where they cause the message to be stored. In the exemplary embodiment of the invention described in detail herein the storage is in the form of perforations or punches in a tape but any suitable type of storage apparatus may be employed.

At the end of the message the operator removes the tape from the reperforator and inserts it in a special multiple address transmitter. It is necessary that the operator read the address codes and operate the proper keys in accordance with these codes. The operation of the keys seizes one level or one of the reperforators associated with each of the outgoing party lines over which the message is transmitted when this reperforator becomes idle. The operator after operating all the desired keys will operate a start key. Thereafter when all of the reperforators associated with the selected lines become idle the message will be simultaneously transmitted to the reperforators associated with these lines. Thereafter the messages will be transmitted over the respective lines just as other messages are transmitted over these lines. However, the control equipment at the various control stations of the party lines in responding to the address codes preceding the message will cause the printers or other recording equipment at each of the stations address on the line to which the station is directed to be connected to the line so that the message will be received substantially simultaneously on all of the selected machines associated with a given party line.

Assume, by way of example, that the subscriber station 317 in Fig. 3 has a message to transmit and that he wishes to have his message transmitted to stations 422, 423, 469 and 473. Preceding the message the subscriber will perforate a special multiple address code ahead of the message.

This multiple message code for the assumed message may take several different forms depending upon the form of connections or cross-connections made at the central switching station and the various control stations. For example, the first character of a two-character multiple address code may indicate to the central switching equipment that it is a multiple address message and the subsequent character or characters may indicate the lines and stations to which it is desired to transmit the message. On the other hand it may be desirable to have the entire two-character multiple message address designate a multiple message and designate all of the stations to which it is desired to transmit the message. Various other combinations of the message codes may likewise be employed as will be readily understood by persons skilled in the art. However, for the purposes of illustration we will assume that the first character indicates to the central switching equipment that the following message will be a multiple address message and then that the next character designates stations 422 and 423 of the party line 401 and a following character designates stations 469 and 473 of party line 402. Following these characters the subscriber will perforate the subsequent message in the tape. This subsequent message may include a repetition of the address codes and other information as may be desired relative to station, origina, date, time, message number, etc. Following the message the subscribed will perforate an end-of-message signal in the tape and then either an end-of-transmission signal or other messages preceded by other address codes. The subsequent message may be an ordinary message of a type described in the above-identified application of Branson et al. or it may be another multiply addressed message as described above.

After the subscriber has perforated one or more messages in the tape the tape will be inserted in the automatic transmitter waiting transmission to the central station. Under the control of the operator at the central switch station or under control of the automatic circuits as described in the above-identified application of Branson et al., a transmitter start signal pattern is transmitted from the transmitter start circuit 510 over the outgoing channel 405 of party line 401. When this start pattern is the pattern assigned to station 417, the transmitter station 417 will be set into operation and transmit the multiply addressed message preceded by the multiple address codes over the incoming channel 406 of party line 401.

When the message signals arrive at the central switching station they will control an incoming line circuit 522, cause the message to be recorded by the recorder 526 since all of the stations for which the message was intended do not include the central switching station.

If, in addition to transmitting the message to the assumed stations it had been assumed that the message to be transmitted was also intended for the central switching station in addition to the stations assumed above, a different group of address codes would have to be perforated in the tape preceding the message which address codes would cause the message to be recorded on both the recorder 526 and the receiving-only printer 523 in the manner described in the above-identified application of Branson et al. However, under the assumed conditions the message will be recorded in the storage recorder 526 only. When the address characters reach the transmitter 525 they will control director 527.

Figure 11:
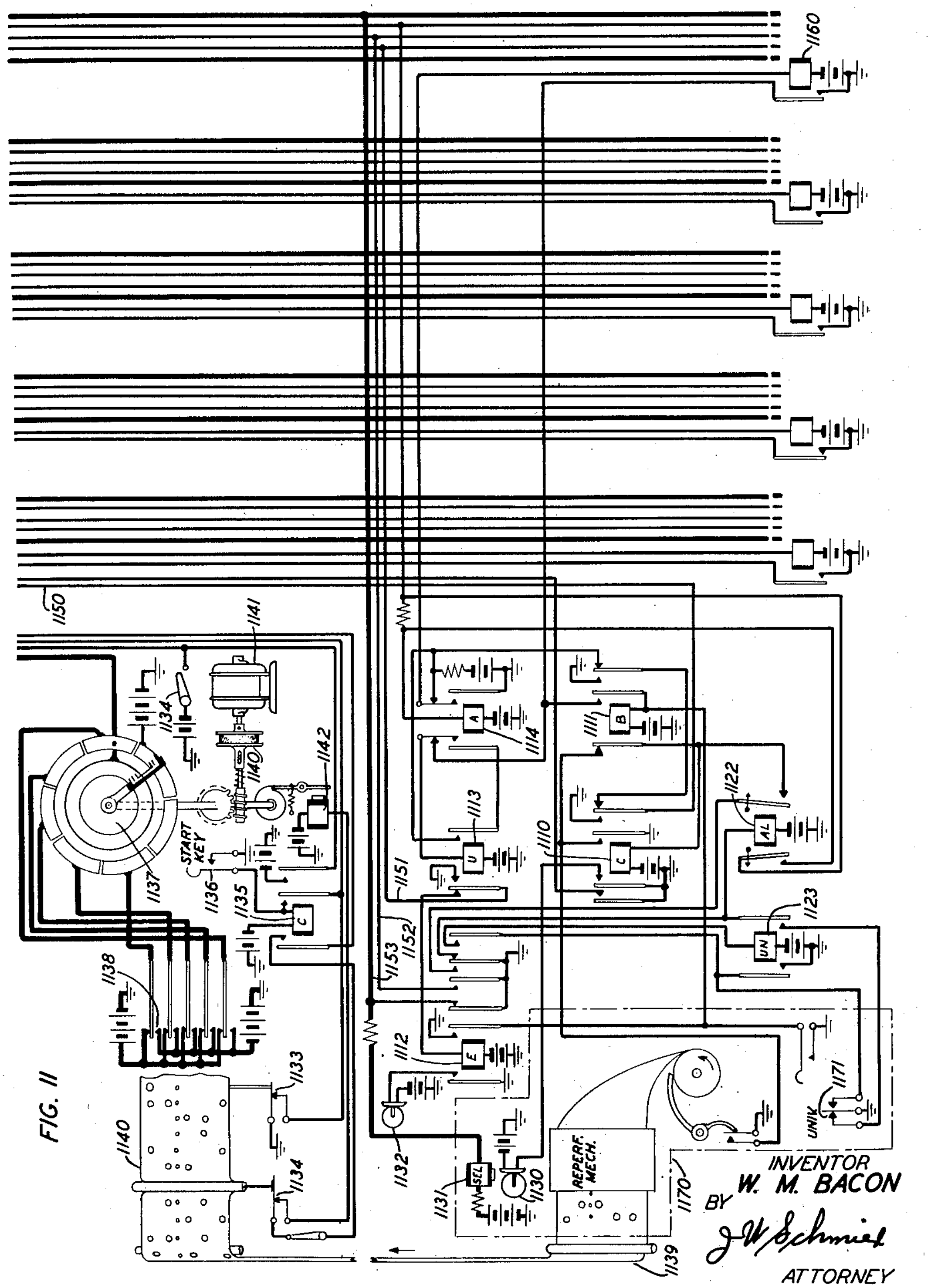

Under the assumed set of conditions wherein the first character of the multiple address codes indicates a multiple address message this character will control a director 527, and cause it to select the multiple address circuit of Fig. 11 in the same way as the first character codes cause the selection of trunk circuits as described in the above-identified application of Branson et al.

If it had been assumed that cross-connection in the director circuits at the central switching station required two characters of an address code to indicate the multiple address message, then the director circuit would respond to the two first characters and again pick the same multiple address circuit.

As shown in the drawing only a single multiple address circuit is shown on the central switching station. It is to be understood, however, that any suitable number of these circuits may be provided and selected under control of the multiple address characters in the same manner as the various recorders are selected in the multiple outlet circuit set forth and described in the United States Patent 2,382,128 issued to Branson on August 14, 1945, the disclosure of which patent is hereby made a part of the present application as is fully included herein.

The operation of the switching circuits in establishing a path from the director 527 to the multiple address circuit of Fig. 11 is substantially the same as the method of establishing paths from the director circuit to any of the storage recorders 518, 519, 618 and 619 or other similar storage recorders as described in the above-identified application of Branson et al.

Briefly, the director upon determining that the message is to be stored in the multiple address storage equipment of Fig. 11, tests the equipment to determine whether or not it is busy. If it is busy the director will wait until the circuit becomes idle. When the circuit becomes idle the director will cause the select magnet 916 associated with the horizontal level of the cross-bar switch to which the director is connected to be operated through the sequence circuit 680. The sequence circuit 680 is arranged to permit only one of the select magnets of the cross-bar switch to be operated at a time.

Assuming that the conditions are such that the select magnet 916 will be operated at this time. The operation of the select magnet 916 applies ground to a lead extending back to the director circuit which causes the director circuit to apply ground to the lead 1150. The director, of course, having previously tested this lead for a busy condition, an open, as well as for crosses as described in the above-identified application of Branson et al. and found it idle as assumed above, the application of ground to lead 1150 through the intercept keys 591, if it is desired to intercept multiple address messages on occasion, completes a circuit from ground over lead 1150 through the right-hand outer break contacts of relays 1110 and 1111, the right-hand break contacts of relay 1114 to a battery through the winding of the cross bar switch hold magnet 1160. The operation of the vertical or hold magnet 1160 during the time the select magnet 916 is operated causes the cross-bar contacts 930 to be closed in a well understood manner. The structural details and manner of operation of cross-bar switches to effect the operation of the cross-point contacts under these circumstances is more fully described and set forth in United States Patent 2,021,329 granted to Reynolds November 19, 1935, the disclosure of which patent was hereby made a part of the present application as is fully included herein.

The operation of the hold magnet 1160 in addition to closing the cross-point contacts 930 also completes a circuit for the operation of relay 1113 from battery through the winding of relay 1113, left-hand break contacts of relay 1114 to ground through the operated contacts of hold magnet 1160. Operation of relay 1113 applies ground to the lead 1151 which extends through the cross-bar switch contacts 930 to the director circuit 527, causing the director circuit to advance and apply ground to a lead extending to the winding of relay 1114. Relay 1114 operates and applies ground to the winding of the hold magnet 1160 and thus maintains this magnet operated.

Relay 1114 in operating also connects the winding of relay 1113 through the left-hand operated contacts of relay 1114, the right-hand operated contacts of relay 1113, and through the right-hand outer break contacts of relays 1111 and 1110 to lead 1150. Relay 1113 is thus maintained operated so long as the director circuit maintains ground on lead 1150 as described above.

However, in advancing and after applying ground to the lead extending to the winding of relay 1114 the director circuit will remove the ground applied to lead 1150 and thus permit relay 1113 to release. Relay 1113 in releasing removes ground from lead 1151 and connects this lead to the winding of relay 1112. In response to the removal of ground from lead 1151 the director advances and applies ground to this lead for operating relay 1112. Relay 1112 in operating removes a holding circuit from the select magnet 1131 of the storage recorder 1170 of the multiple address storage equipment and thus permits this magnet to respond to any signals received over the conductor 1153. Relay 1112 in operating also applies ground to conductor 1152 which extends through the cross-bar switch to the director circuit and indicates to the director circuit that the recording equipment and circuits of the multiple address circuits are in condition for responding to signals transmitted to it over the transmission path. Operation of relay 1112 also conditions the trouble and alarm relays 1123 and 1122 to insure that the signals transmitted from the director circuit will be received by the perforating or storage mechanism 1170. Relay 1112 in operating interrupts the circuit to the winding of the relay 1122. This relay is a slow release relay so it will not release for a predetermined or short interval of time.

If no signals are received during this short interval of time, however, relay 1122 will release and cause relay 1110 to operate. Relay 1110 in operating completes the circuit for lighting the trouble lamp 1130 and also applies ground to the alarm circuit shown in Fig. 8 thus indicating a trouble condition.

If, however, signals are received prior to the time relay 1122 releases the universal contacts 1171 of the recorder 1170 will be actuated in response to these signals and complete a circuit for the operation of relay 1123. The operation of relay 1123 completes the circuit for maintaining its self-operated and for extending the winding of relay 1122 to the universal contacts 1171, thus maintaining relay 1122 operated.

The operation of relay 1112 in addition completes a circuit for the operation of the busy relay 1111 from ground through the innermost right-hand operated contacts of relay 1112 to battery through the winding of relay 1111. Relay 1111 locks operated under control of the hold magnet 1160 and applies ground to the lead 1150 extending through the intercept keys to the director circuits thus maintaining a busy condition on this lead so that other director circuits will be unable to seize or transmit messages to the multiple address equipment shown in Fig. 11.

As described in the above-identified patent to Branson et al. two transmission paths extend from the director circuit to the cross-bar switch and the storage devices connected to the cross-bar switch may be connected to either one or the other of these transmission circuits. In one case the entire address code is transmitted over the lead, but the first address character or code group is not transmitted over the second of the two transmission leads. While the transmission circuit extending to the multiple address storage equipment 1170 of Fig. 11 may be connected to either one of these leads as desired, it is assumed herein that this lead will be connected to the lead over which the entire address code followed by the message is transmitted so that all of the address codes as well as the message will be perforated by the storage equipment 1170 thus permitting the operator to examine all of the address codes transmitted by the subscriber. The end-of-message signals or codes following the message incident to being recorded by the recorder 1170 cause this recorder to be disconnected from transmitter 525 and the cross-bar switch and related circuits to be restored to their idle or normal condition. The multiple address recorder as well as the other circuits and equipment is then free to handle other messages.

At the end of the message the operator or attendant at the central switching station will tear or cut the tape and insert the beginning end of it in the tape transmitter shown in Fig. 11. Upon insertion of the tape in this transmitter the tape control contacts 1133 will close. Either before or during or after the operator inserts the tape in transmitter of Fig. 11 she will examine the address codes and determine first that the message is a multiple address message, then upon reference to the directory or other information the operator can determine upon which lines the stations to which the message is directed are connected.

If the equipment is arranged so that a single two-character address is employed to designate all of the stations to which the message is intended to be transmitted the operator can determine what lines to transmit the message over. If on the other hand, as assumed above, the first character designates a multiple address message, the next character certain stations connected to one line and subsequent characters and stations connected to another line, etc., the operator can determine this by reference to material supplied to her and in turn she will cause the message to be transmitted to the desired line. As assumed above, the first multiple address character say M designated the multiple address equipment of the central station, the second character say R designated stations 422 and 423 of party line 401 and the third character say S designates stations 469 and 473 of party line 402. Under these circumstances the operator upon noting the R will operate the key 922 in one direction so that the upper set of contacts will close but the lower set will not open. In other words key 922 is a 3-position key. Momentary operation of key 922, so that the upper set of contacts closes, completes a circuit for the operation of relay 914 assuming of course that the busy key of this upper reperforator 518 associated with party line 401 is released. Relay 914 in operating completes a circuit for maintaining itself operated under control of the multiple address circuit and the lower set of contacts of key 922. The operation of relay 914 also completes a circuit for the lighting of lamp 920 indicating that a multiple address message is to be transmitted over the party line 401.

Relay 914 in operating also completes a circuit for operating busy relay 711 or maintaining this relay operated if the reperforator 518 is busy receiving a message. The operator likewise upon noting the S in the multiple address characters will operate key 1922 so that its upper contacts are closed thus causing relay 1914 to operate and perform functions with respect to the outgoing line circuits of party line 402 similar to those described above with reference to the similar keys, relays, lamps, etc. shown in Fig. 9.

If the multiple address message is intended for other lines not shown, it being assumed of course that any suitable number of lines are provided in any communication systems, the operator will operate the corresponding keys associated with these other line circuits which keys in turn cause the equipment of these other lines to respond in a manner described above.

Any time after the operator has operated all of the keys associated with lines over which the message is to be transmitted she may operate the start key 1136 which causes relay 1135 to operate and lock operated under control of the tape-out contacts 1133.

Figure 7:
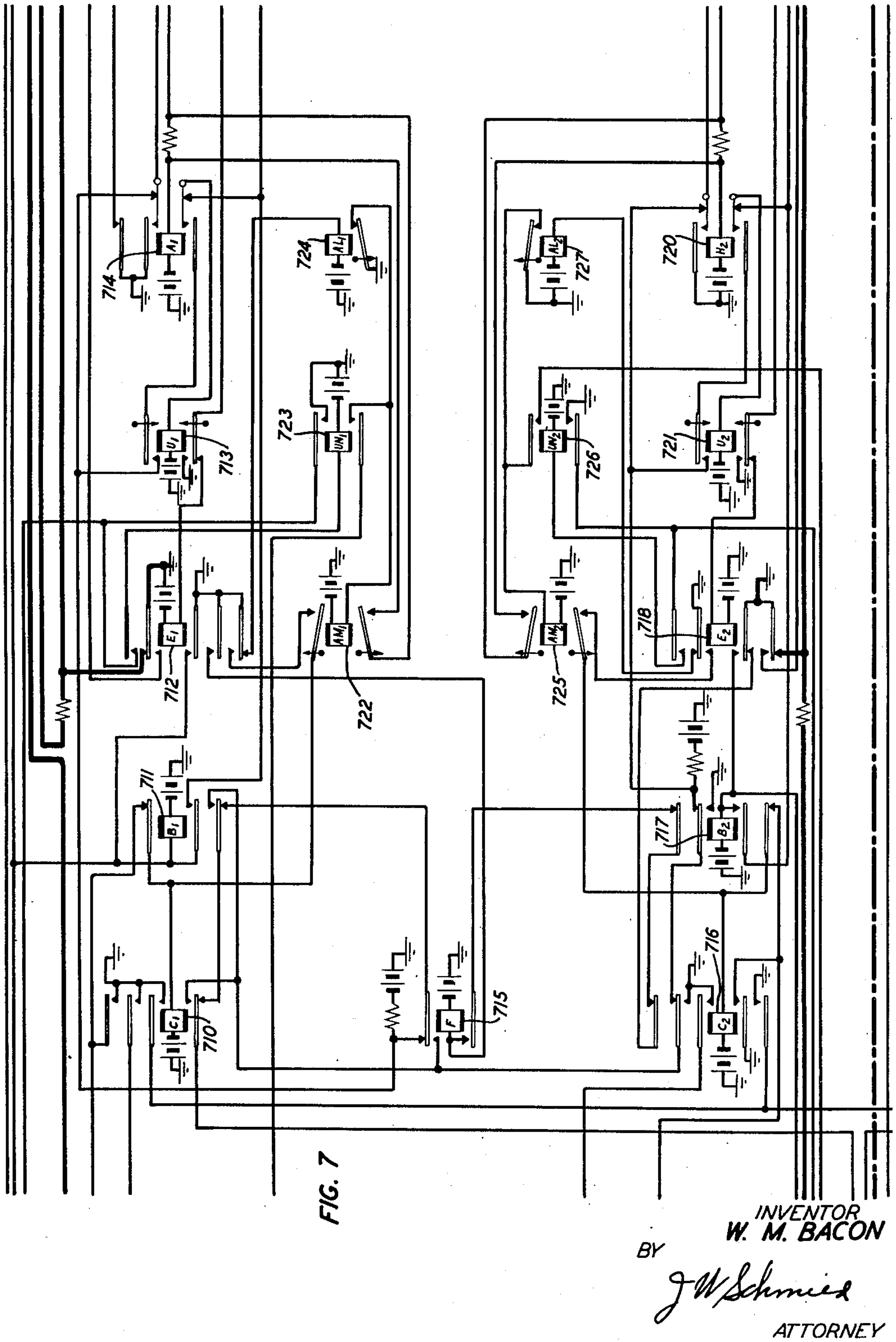
Figure 8:
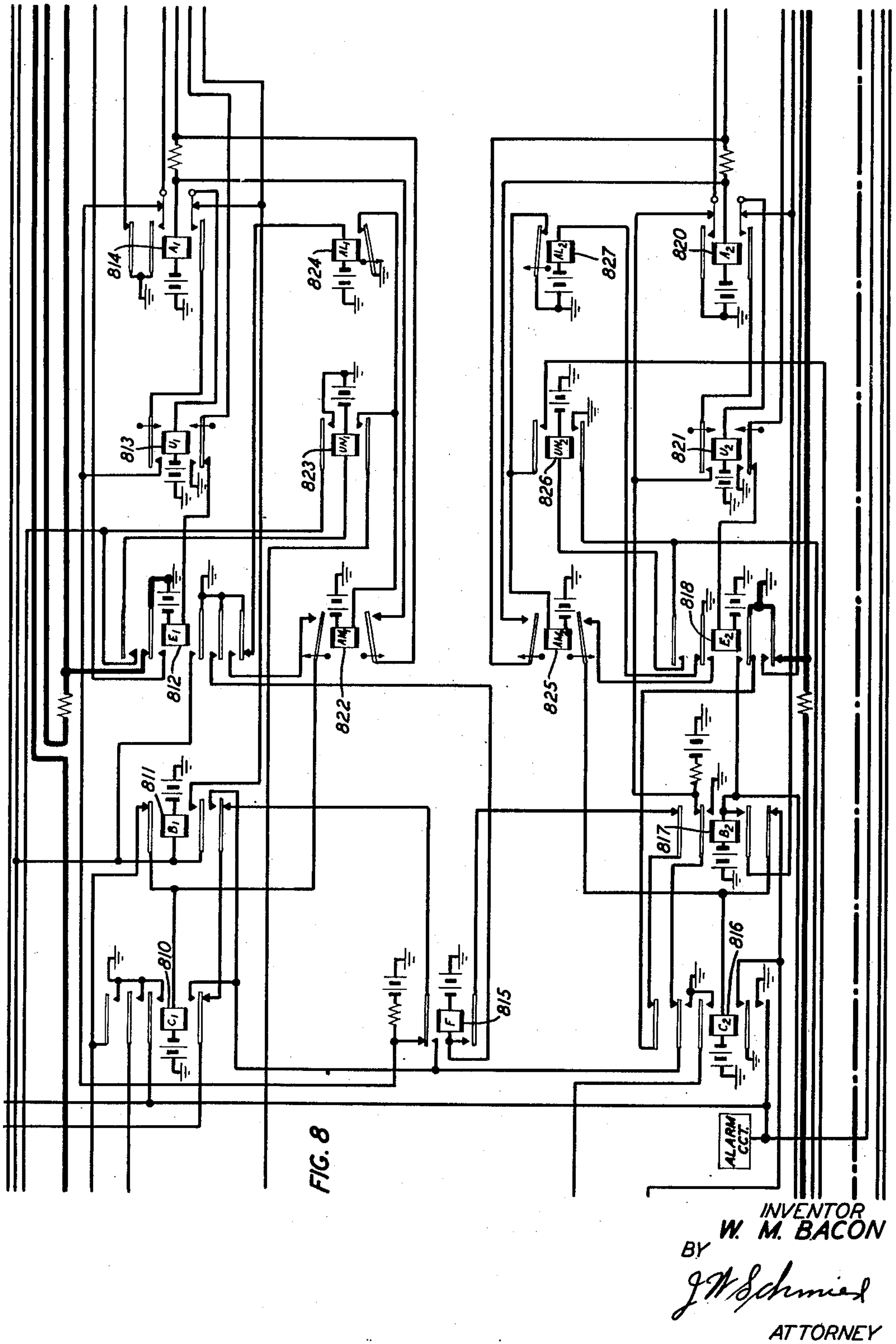
Figure 9:
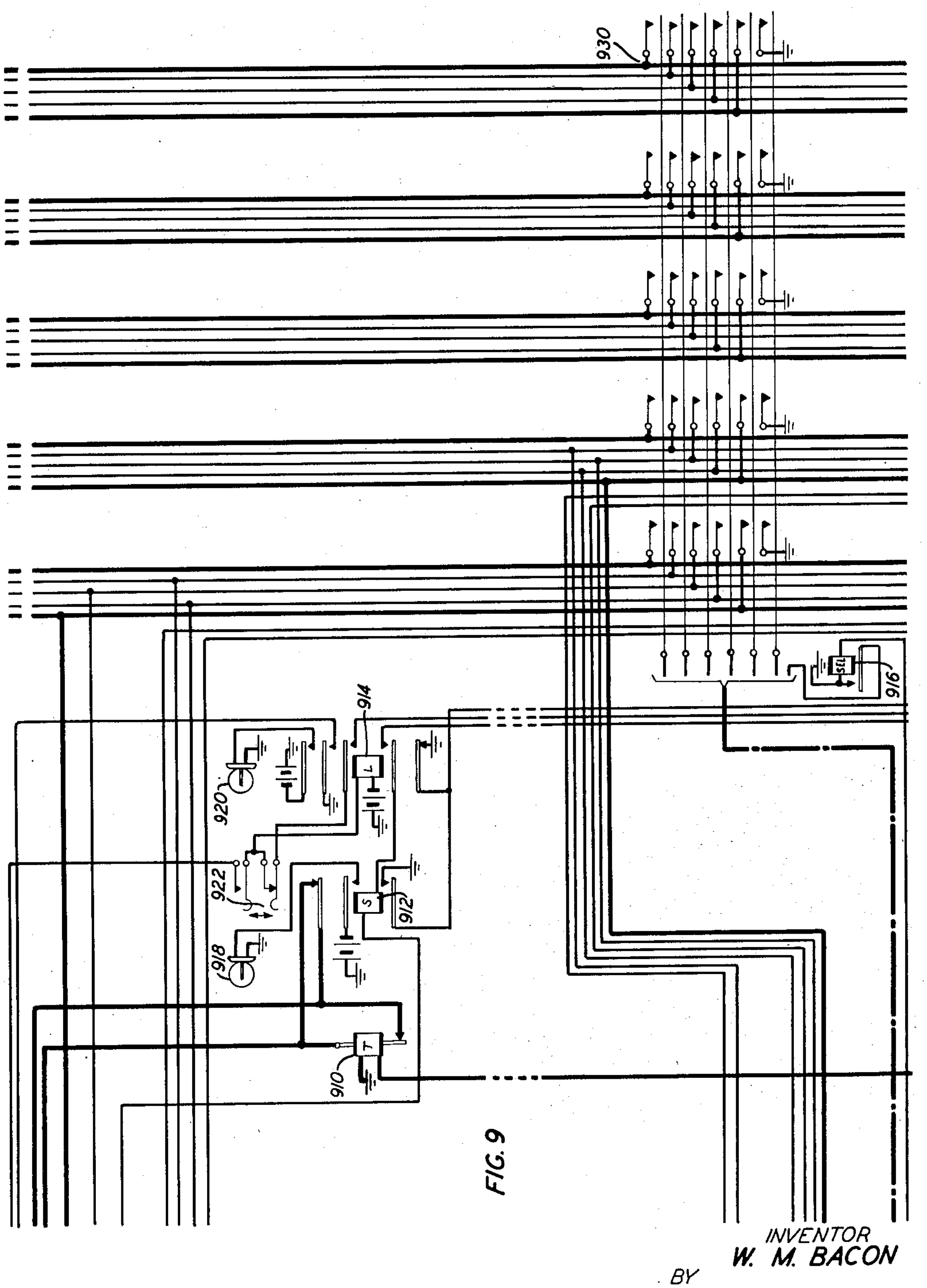
Figure 10:
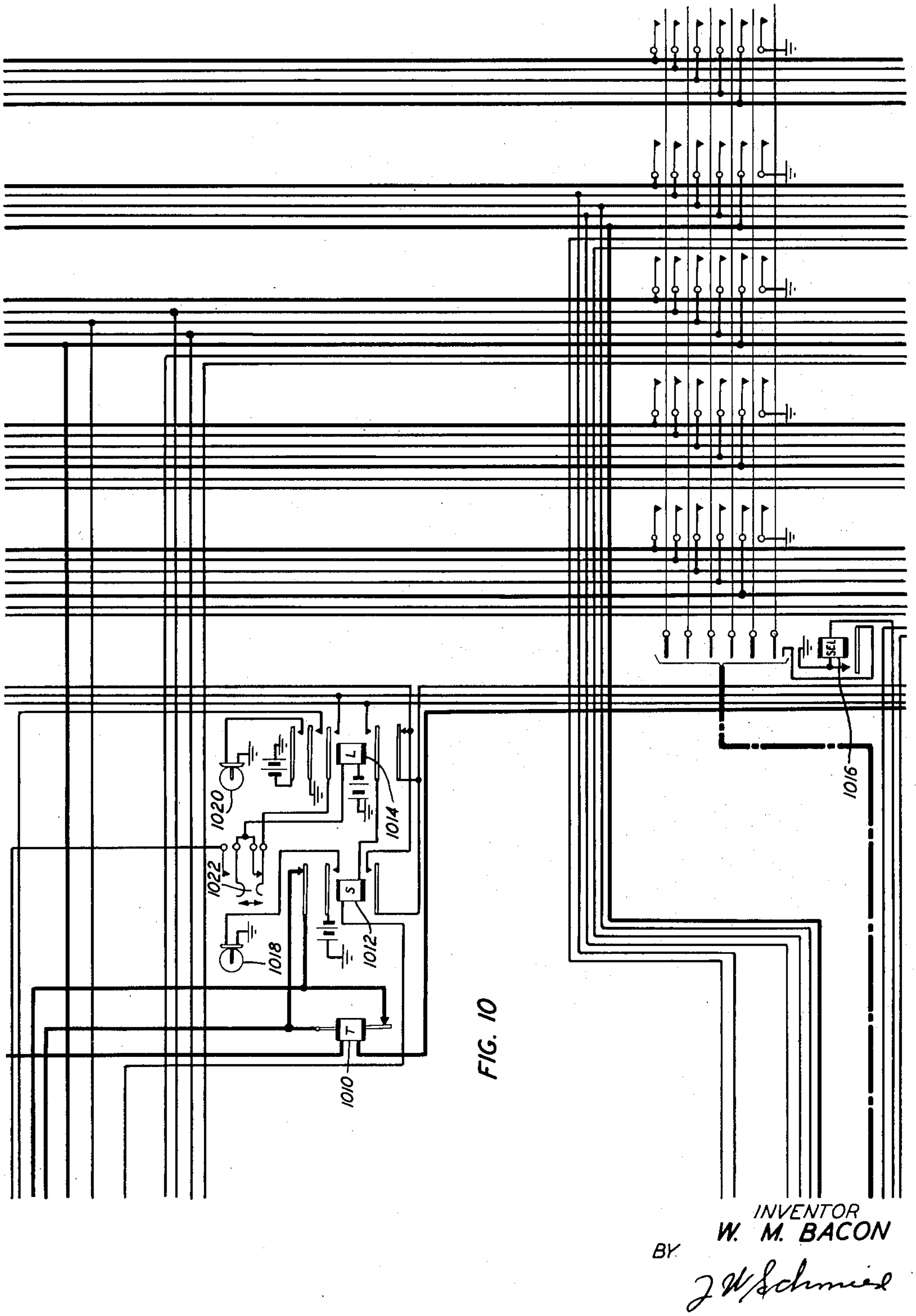

The outgoing line circuits shown in Fig. 7 are associated with the party line 401 while the circuits of Fig. 8 are associated with the party line 402. Each of these party lines is provided with two outlets from the switching equipment and has associated with it two reperforator or storage devices, such as 518 and 519 of party lines 401 and 618 and 619 of line 402. Relays 710 through 714 and 722 through 724 are associated with the upper level and reperforator 518 while relays 716 through 720 and 725 through 727 are associated with the reperforator 519 and the lower level. Relay 715 is employed to alternate first choices between the two levels in case both levels are idle.

Similarly, relays 810 through 814 and 822 through 824 and reperforator 618 comprise equipment for the upper level of the outgoing line circuit of line 402 while relays 816 through 820 and 825 through 827 as well as storage device 619 provide a lower level for outgoing messages for line 402. Relay 815 is similarly provided to alternate first choices between the two levels in case both levels are idle.

Both of these outgoing line circuits and the relays and equipment associated therewith operate in a manner as described in the above-identified application of Branson et al. for singly addressed messages. Consequently, a detailed description of this operation need not be repeated here.

However, it should be pointed out that, in case any of these levels is in the process of recording messages from any of the transmitters associated with directors, various relays including the respective relays 714, 720, 814 and 820 will be operated. At the completion of the recording of each message by the respective recording devices, the above-enumerated relays are released and then reoperated for the next message.

Returning now to the assumed multiply addressed message, if the upper level of either Fig. 7 or 8 is busy the respective relays 714 and 814 will be operated. Assuming, for example, that the upper level of the equipment shown in Fig. 8 is busy so that relay 814 is operated at the time the start key 1136 is operated and further assume that the upper level of Fig. 7 is idle at this time. Under these circumstances, the operation of relay 914 as described above completes a circuit for the operation of relay 912 from ground through the upper break contacts of relay 714, the winding of relay 912 through the lower inner operated contacts of relay 914, to battery through the right-hand outer operated contacts of relay 1135. Relay 912 in operating completes a circuit for lighting lamp 918 to indicate to the operator that the upper level associated with line 401 has been seized by the multiple address equipment and circuits.

However, under the assumed conditions with relay 814 operated, relay 1012 does not operate at this time. Consequently, the circuit is maintained in the condition described until either the upper level of Fig. 8 becomes idle and relay 814 released, or until the operator operates key 1022 to release relay 1014. Assume that at some later time the upper level of the outgoing line circuit of line 402 shown in the upper portion of Fig. 8 becomes idle and relay 814 releases. At this time a circuit is completed for the operation of relay 1012 from ground through the upper break contacts of relay 814 through the winding of relay 1012, the lower inner operated contacts of relay 1014 to battery through the right-hand outer operated contacts of relay 1035. Relay 1012 in operating, lights the lamp 1018 and removes the short circuit from around the contacts of the repeating relay 1010.

The last one of the relays similar to 912 and 1012 to be operated, will complete a chain circuit through the lower operated contacts of these relays and the lower break contacts of the unoperated relays corresponding to 914 associated with other lines and through the left-hand operated contacts of relay 1135, the taut tape contacts 1134 to battery through the winding of the clutch magnet 1142. Operation of this clutch magnet releases the distributor 1131 so that it will transmit the signals stored in the tape 1140 as determined by the tape controlled contacts 1138 through the repeating relays 910, 1010 and the other repeating relays associated with other lines. The repeating relays 910, 1010, etc. thereupon repeat the signals to the reperforators 518, 618, etc. associated with the lines extending to stations to which it is desired to transmit the multiply addressed message. It should be noted that the message is transmitted simultaneously to all of these devices and recorded in the storage medium for later transmission over the outgoing line circuits to the stations of address in the normal manner of operation of the system as described in the above-identified application of Branson et al.

It is, of course, apparent that the messages in the general case need not be transmitted simultaneously over the outgoing line but will be so transmitted if the lines all happen to be idle at the time it is desired to transmit the multiply addressed message.

In order to transmit the message to a plurality of stations on each outgoing line it is necessary to modify the cross-connections at the control centers from the connections shown in the above-identified application of Branson et al. In the system described in that application, certain or all of the control centers are provided with a relay similar to relay 248 shown in Fig. 2. The winding of this relay extends through break contacts of gate relays similar to 204 to contacts controlled by the receiving selector mechanism at the secondary switching centers. As described in the above-identified application of Branson et al. this receiving selector mechanism receives and responds to all of the signals transmitted from the central switching station and selectively closes contacts in response to the reception of predetermined code signals. As described in the above-identified application of Branson et al, relay 248 and the similar relays at other stations are connected to contacts actuated by carriage return signals.

In accordance with the present application this relay may still be actuated by the same contacts and other relays similar to this relay actuated by the multiple address signals. It is, of course, apparent that if desired, the cross-connections to relay 248 and similar relays of the other control stations may be modified so that this relay will respond to other multiple address codes. The contacts of this relay and the corresponding relay at other stations are cross-connected so that the desired ones of the station will be connected to the receiving channel of the party line and rendered operative to record the subsequent message transmitted over the line from the central switching station. In addition one such group relay is provided at each of the switching centers of the respective party line for each different group code which designates one or more stations on the given line. Of course certain different ones of the group codes may include a given station in which case the contacts of the various group relays at the controlling switching center will have contacts cross-connected to connect the proper station or stations.

Thus, under the assumed conditions, such a relay would be provided at the secondary switching center 431 and cross-connected first to respond to the second of the multiple address codes transmitted over the lines and further cross-connected so that the operation of this relay would associate the receiving devices at stations 422 and 423 with the party line 410. Similarly, the control equipment at stations 464 and 463 would be provided with a relay similar to relay 248, which relay would be cross-connected to respond to the third of the multiple address codes under the above-assumed conditions and further cross-connected to connect the receiving devices at stations 469 and 473 to the receiving channel 407 of party line 402 so that the subsequent message would be received by these stations.

Consequently, the multiple address message will be delivered to each of the desired stations.

At the end of the multiple addressed message the tape 1140 will run out of the transmitter and cause contacts 1133 to open and interrupt the locking circuit of relays 1135, 1014 and 914 thus permitting these relays to release and in turn release relays 912, 1012, etc., thus restoring the multiple address circuit to its normal or idle condition. The end-of-message signal following this message when transmitted over the outgoing channels 405 and 407 of the respective party lines 401 and 402 causes the equipment associated with these lines to be restored to its normal or idle condition, wherein they are ready to respond to other singly or multiply addressed messages transmitted over them.

If an operator should inadvertently falsely operate one of the keys 922 or 1022, etc., she may cancel the registration by the operation of the corresponding keys 922 or 1022, or other similar keys so that the lower set of contacts controlled by these keys is open. Under these circumstances the locking circuit of relay 1014 is released thus permitting this relay to release and in turn associated with relays 912 or 1012 and thus prevent transmission of the subsequent message or message material over the line in question.

In case it is desired to transmit only a part of a multiple addressed message to one or more of the multiple addressed stations the operator may interrupt the transmission to all of the stations on a party line by operation of key 1022 as described above.

What is claimed is:

1. In a telegraph switching system, a main switching station, a plurality of subscribers' lines extending therefrom, a plurality of subscriber stations connectable to each of a plurality of said subscribers' lines, switching apparatus responsive to certain signals appended to each message designating one or more stations connectable to one of said subscribers' lines for conveying said message to said stations under control of said designations, other equipment responsive to other signals appended to said same message designating stations connectable to other of said subscribers' lines for conveying said message to said other stations under control of said other designations accompanying said message.

2. In a telegraph switching system, a main switching station, a plurality of subscribers' stations, a plurality of party lines connectable to said subscribers' stations, apparatus responsive to a predetermined set of signaling conditions for causing the accompanying message to be automatically transmitted to a predetermined group of said subscribers' stations connectable to one party line, other equipment responsive to the same predetermined set of signaling conditions for causing said message to be automatically transmitted to another group of said subscriber stations connectable to another party line.

3. In a telegraph switching system, a plurality of subscribers' lines, a plurality of transmission paths leading to each of said subscribers' lines for transmitting messages toward said subscribers' lines, a multiple address or broadcast transmission circuit, means for connecting one of said paths to said multiple address circuit while leaving others of said paths to said lines free to transmit other messages towards said lines, and apparatus for transmitting multiply addressed messages from said multiple address transmission apparatus simultaneously over all seized paths when the last path over which the messages to be transmitted becomes available for transmission.

4. In a telegraph switching system, a plurality of subscribers' lines, a plurality of storage devices individual to each of said subscribers' lines for storing messages for transmission over said subscribers' lines, a multiple address transmission circuit, means for connecting one of said storage devices to said multiple address circuit while leaving others of said devices individual to said lines free to store other messages for transmission over said lines, and apparatus for transmitting multiply addressed messages from said multiple address transmission apparatus simultaneously to all seized devices when the last device to which the messages to be transmitted becomes available for transmission.

5. In a telegraph switching system, a plurality of subscribers' lines, a plurality of transmission paths leading to each of said subscribers' lines for transmitting messages toward said subscribers' lines, a multiple address transmission circuit, means for connecting one of said paths to each of a plurality of subscribers' lines to said multiple address circuit while leaving others of said paths to said lines free to transmit other messages toward said lines, and apparatus for transmitting multiply addressed messages from said multiple address transmission apparatus simultaneously over all seized paths when the last path over which the message to be transmitted becomes available for transmission, and apparatus for individually releasing each selected path at any time prior to or during the transmission of the message thereover from said multiple address apparatus.

6. In a telegraph switching system, a plurality of subscriber stations, a plurality of sources of messages including directing signals appended thereto located at subscriber stations, a plurality of telegraph transmission lines each extending to a plurality of said subscriber stations, a central switching station to which said lines extend, telegraph receiving equipment located at each of said subscriber stations, automatic switching equipment at said central station for automatically directing a message having appended thereto directing signals designating one receiving device to transmission paths extending toward said receiving device, a multiple transmission circuit, other automatic switching equipment for directing messages having signals appended thereto designating a plurality of receiving devices to said multiple transmission circuit, switching means for conveying a given message from said multiple transmission circuit to a plurality of said line circuits, means for transmitting said messages together with said directing signals over said lines, and switching equipment connected to said lines responsive to directing signals to connect the designated stations to said lines.

7. In a telegraph switching system in combination a plurality of subscriber stations, sources of message signals and associated directing signals located at said subcriber stations, a plurality of telegraph transmission lines each extending to a plurality of said subscriber stations, a central switching station to which said lines extend, telegraph receiving apparatus located at a plurality of said subscriber stations, switching apparatus controlled by directing signals for connecting said receiving apparatus at the subscriber stations to the lines extending to the respective stations, a multiple transmission circuit, apparatus responsive to directing signals designating more than one subscriber's station for automatically conveying the associated message to said multiple transmission circuit, switching means for directing said message and at least a portion of the directing signals to a plurality of said lines.

WALTER M. BACON.

REFERENCES CITED

The following references are of record in the file of this patent:

UNITED STATES PATENTS

| Number | Name | Date |
|---|---|---|
| 1,343,256 | Field | June 15, 1920 |
| 2,269,379 | Patton | Jan. 6, 1942 |
| 2,279,295 | Blanton | Apr. 14, 1942 |
| 2,346,173 | Light | Apr. 11, 1944 |
| 2,361,342 | Willis | Oct. 24, 1944 |
| 2,392,356 | Bacon | Jan. 8, 1946 |
| 2,400,124 | Light | May 14, 1946 |
| 2,495,682 | Bacon et al. | Jan. 31, 1950 |
| 2,495,683 | Bacon | Jan. 31, 1950 |